United States Patent [19]
Gilbert et al

[11] Patent Number: 5,331,718
[45] Date of Patent: Jul. 26, 1994

[54] CYLINDER REPAIR BRACKET

[76] Inventor: Bob W. Gilbert, P.O. Box 3, Spearsville, La. 71277; Bob C. Gilbert, Sr., Rt. 2, Box 208, Bernice, La. 71222; Vernard K. Brazzel, Rt. 5, Box 3110, Ruston, La. 71270

[21] Appl. No.: 5,490

[22] Filed: Jan. 19, 1993

[51] Int. Cl.⁵ .......................... E05C 17/30; F16F 9/32
[52] U.S. Cl. .................................... 16/82; 267/64.12; 188/300; 403/109
[58] Field of Search .................. 16/49, 82; 24/19, 279; 292/256.65, 258; 296/56, 76; 267/64.12; 188/300; 403/109

[56] References Cited

U.S. PATENT DOCUMENTS

| | | | |
|---|---|---|---|
| 2,522,494 | 9/1950 | Baldo | 24/19 |
| 3,359,017 | 12/1967 | Schaub | 24/19 |
| 3,529,854 | 9/1970 | Thomas | 24/19 |
| 3,813,733 | 6/1974 | Flohr | 24/279 |
| 4,382,311 | 5/1983 | Watts | 16/66 |
| 4,546,524 | 10/1985 | Kreft | 24/19 |
| 4,660,862 | 4/1987 | Cassel et al. | 24/279 |
| 4,813,100 | 3/1989 | King | 16/49 |
| 4,815,163 | 3/1989 | Simmons | 16/49 |
| 4,865,169 | 9/1989 | Rachels et al. | 267/64.12 |
| 4,925,230 | 5/1990 | Shelton | 296/76 |
| 5,024,303 | 6/1991 | Kosloff | 267/64.12 |
| 5,048,150 | 9/1991 | Guerin | 16/49 |

OTHER PUBLICATIONS

U.K. Patent Application No. 2,139,282 A; pub. Nov. 7, 1984 inventor: Edwards.

*Primary Examiner*—Lowell A. Larson
*Assistant Examiner*—Donald M. Gurley
*Attorney, Agent, or Firm*—John M. Harrison

[57] ABSTRACT

A cylinder repair bracket which is designed to apply a selected degree of telescoping tension on the pistons of fluid-operated cylinders which connect closures such as hoods, deck lids, tailgates and like vehicle body members for movement between the open and closed positions. In a preferred embodiment the cylinder repair bracket includes a pair of hose clamps, one of which is tightly secured to the cylinder housing and the other to the piston of the cylinder. The hose clamps are connected by a band connector to facilitate adjusting the degree of telescoping tension in the piston by tightening or loosening the hose clamp attached to the piston. In this manner, compensation for wear in the telescoping piston-cylinder housing connection can be effected.

2 Claims, 1 Drawing Sheet

CYLINDER REPAIR BRACKET

BACKGROUND OF THE INVENTION

1. Field of the Invention

This invention relates to telescoping cylinders attached to closure members in vehicles, and more particularly, to a cylinder repair bracket which compensates for wear in the telescoping piston and cylinder housing elements of a fluid cylinder over a period of time. In a preferred embodiment the cylinder repair bracket is characterized by a pair of hose clamps, one of which is tightly attached to the cylinder housing and the other to the cylinder piston with a desired degree of tension and the hose clamps are connected by a band connector. A desired degree of reciprocating tension can be applied to the piston of the fluid cylinder by adjusting the piston hose clamp to facilitate extension and retraction of the piston with respect to the cylinder in a controlled manner regardless of the weight applied to the piston.

Modern vehicles are frequently fitted with controlled closure devices such as fluid-operated cylinders attached to the vehicle body and to the hood, deck lid or tailgate of the vehicle to facilitate controlled opening and closure of the hoods, deck lid or tailgate with respect to the vehicle body. Sealed fluid-operated or fluid-controlled cylinders are ideal devices for achieving this controlled opening and closure of the vehicle hood, deck lid or tailgate, since extension and retraction of the respective cylinder pistons into and from the cylinder housing against sealed fluid pressure such as air, serves to dampen rapid movement of the hood, deck lid or tailgate, thereby facilitating easier and safer opening and closure of these hoods, deck lids or tailgates. Furthermore, fluid-operated cylinders are also efficient to maintain the hood, deck lid or tailgate of a vehicle in an open configuration to facilitate loading and unloading the vehicle without requiring the assistance of the operator or using a prop or other safety device. However, with the passage of time, these fluid-operated cylinders tend to leak and wear and sometimes allow the hood, deck lid or tailgate of the vehicle to drop suddenly, with resulting injury, or at best, inconvenience, to the operator. At this point, the fluid-operated cylinders must normally be replaced, usually in pairs, at considerable expense, inconvenience and loss of time to the vehicle owner.

2. Description of the Prior Art

Various closure devices for operating doors, hoods, deck lids, tailgates and like closures, are well known in the art. U.S. Pat. No. 4,382,311, dated May 10, 1983, to John R. Watts, details a "Door-Closure Apparatus" which includes an elongated, cylindrical housing which receives a sliding piston. The piston has a free end that extends outwardly and includes multiple grooves to receive an adjustable retainer clamp and regulate the inward longitudinal movement of the piston in the housing. U.S. Pat. No. 4,813,100, dated Mar. 21, 1989, to Daniel P. King, details a "Closure Check" for temporarily bracing a conventional cylinder/piston mechanism in the "open" configuration. The closure check includes a longitudinal brace, a positioning device, an engagement device and a disengagement device. The closure check can automatically engage with the cylinder/piston mechanism or may be engaged manually by the user. A "Storm Door Lock Apparatus" is detailed in U.S. Pat. No. 4,815,163, dated Mar. 28, 1989, to William O. Simmons. The apparatus includes a clamp secured to an associated screen door-type closure member that further secures a slidable rod mounted with an abutment surface for actuation by a user. A pivoted lever is provided at the other end of the rod for canting about a piston rod associated with the door closure. An L-shaped link may be secured to the abutment member for allowing engagement and access by a user. U.S. Pat. No. 4,925,230, dated May 15, 1990, to Alan J. Shelton, details a "Hold Open Device For Compartment Lid". The device includes a pair of telescoping members pivotally connected to the compartment lid and body of a vehicle and a releasable latching mechanism for automatically holding the telescoping members in an extended position, with the closure in its open position. The latching mechanism is constructed such that it may be automatically released by exerting a downward force in excess of a predetermined magnitude on the closure to move the latter to its closed position. U.S. Pat. No. 5,048,150, dated Sep. 17, 1991, to Philip Guerin, details a "Door Holder" which includes a holding member adapted to be secured between the door and the frame of the door. The holding member includes a lever that may be clamped in either a first release position, in which the door is free to be opened and closed, or a second holding position, in which the door is held open. A foot-operated actuating device operated by a user controls the lever to move it into a clamping position to hold the door open.

It is an object of this invention to provide a cylinder repair bracket for mounting on a cylinder housing and piston and controlling the degree of pressure required to retract and extend the piston into and from the cylinder housing.

Another object of the invention is to provide a cylinder repair bracket which is mounted on the cylinder housing and piston of a fluid cylinder for regulating the retracting and extension tension of the piston with respect to the cylinder housing.

Still another object of this invention is to provide a new and improved cylinder repair bracket which is simple in design, easy to install and operative to mount on a cylinder housing and piston of a fluid cylinder to regulate the telescoping action of the piston.

Yet another object of this invention is to provide a cylinder repair bracket which is characterized by a first hose clamp tightly secured to the cylinder housing of fluid cylinder, a second hose clamp attached to the piston of the fluid cylinder with a desired degree of tension and a connecting member connecting the first hose clamp to the second hose clamp, wherein the gripping tension between the second hose clamp and the cylinder piston is adjusted to regulate the telescoping action of the piston into and from the cylinder housing.

SUMMARY OF THE INVENTION

These and other objects of the invention are provided in a new and improved cylinder repair bracket which is characterized in a most preferred embodiment by a first slotted hose clamp tightly secured to the cylinder housing of the fluid cylinder near the point of entry of the piston, a second slotted hose clamp mounted on the fluid cylinder piston and at least one connecting member connecting the first slotted hose clamp to the second slotted hose clamp to facilitate adjusting the tension of the second hose clamp on the cylinder piston and regulation of the telescoping tension between the cylinder piston and the cylinder housing.

BRIEF DESCRIPTION OF THE DRAWING

The invention will be better understood by reference to the accompanying drawing, wherein.

DESCRIPTION OF THE PREFERRED EMBODIMENTS

Figure 1:
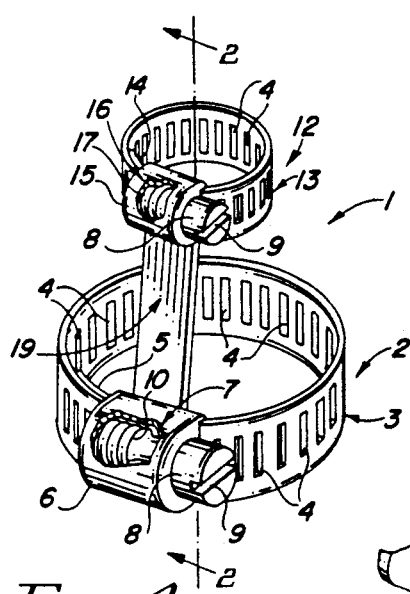
FIG. 1 is a perspective view of a first preferred embodiment of the cylinder repair bracket of this invention.
Figure 2:
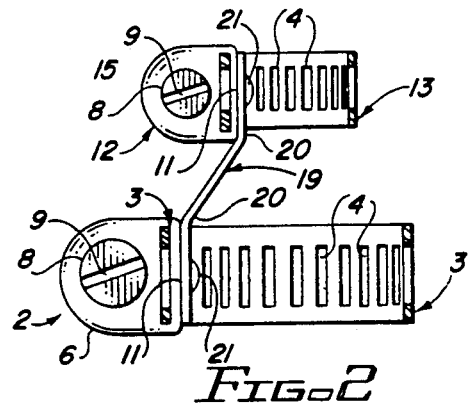
FIG. 2 is a side view of the cylinder repair bracket illustrated in FIG. 1.
Figure 3:
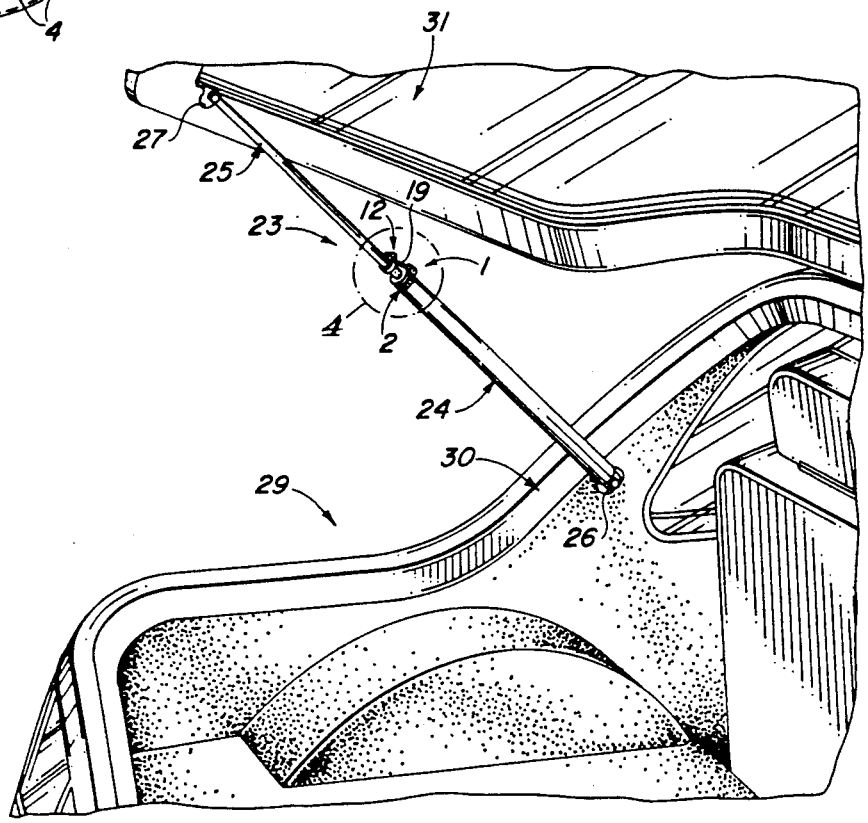
FIG. 3 is a perspective view of a typical fluid-operated cylinder and a cylinder repair bracket mounted in functional operating configuration on the fluid-operated cylinder.
Figure 4:
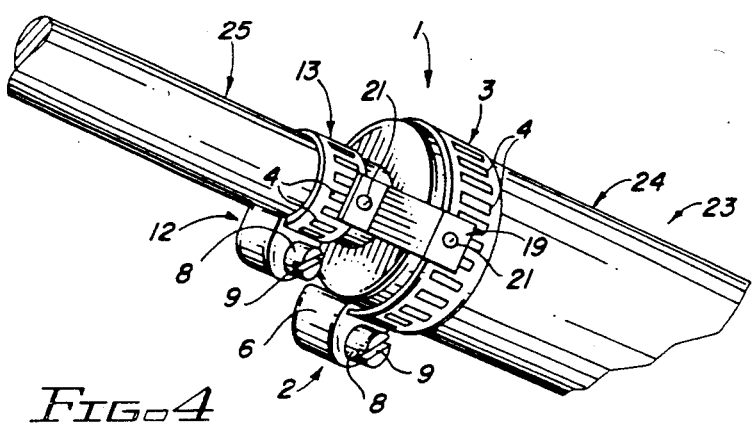
FIG. 4 is a perspective, enlarged view of an alternative preferred embodiment of the cylinder repair bracket in mounted configuration as illustrated in FIG. 3.

Referring to FIGS. 1 and 2 of the drawing, in a preferred embodiment the cylinder repair bracket of this invention is generally illustrated by reference numeral 1. The cylinder repair bracket i is designed for mounting on a conventional fluid cylinder 23, having a cylinder housing 24 and a piston 25 adapted for dampened reciprocation by a fluid such as air, sealed in the cylinder housing 24, as illustrated in FIGS. 3 and 4. The base of the cylinder housing 24 is mounted on the vehicle frame 30 of a vehicle 29 by means of a housing bracket 26, while the free end of the piston 25 is secured to the vehicle hatch 31 of the vehicle 29 by means of a piston bracket 27. The cylinder repair bracket 1 includes a cylinder clamp 2 and a piston clamp 12 connected by a band connector 19, which cylinder clamp 2 includes a cylinder clamp band 3 which is sized to fit the cylinder housing 24. The cylinder clamp band 3 is fitted with spaced band slots 4 and one end of the cylinder clamp band 3 is secured to a cylinder clamp band mount 6, fitted with a rotatable cylinder clamp band screw 7 having a screw head 8, fitted with a head slot 9. The opposite cylinder clamp band end 5 terminates inside the circle defined by the cylinder clamp band 3, as illustrated in FIG. 1. A cylinder clamp screw gear 10 is provided on the cylinder clamp band screw 7 and engages the respective bands defined by corresponding band slots 4 in sequence as the cylinder clamp band end 5 of the cylinder clamp band 3 is threaded through a slot defined by the cylinder clamp band mount 6 and a mount flange 11, as illustrated in FIG. 2.

Similarly, the piston clamp 12 is characterized by a smaller piston clamp band 13 which is sized to fit the piston 25 of the fluid cylinder 23. The piston clamp band 13 also features spaced band slots 4, with a piston clamp band end 14 threaded through a slot defined by a mount flange 11 and the piston clamp screw gear 17 of a piston clamp band screw 16 mounted for rotation in a piston clamp band mount 15, as further illustrated in FIG. 2. The respective mount flanges 11 are provided on the cylinder clamp band mount 15 and piston clamp band mount 15 to accommodate the cylinder clamp band 3 and piston clamp band 13 respectively, and facilitate engagement of the cylinder clamp screw gear 10 and piston clamp screw gear 17 with the bands defined by the respective band slots 4 in the cylinder clamp band 3 and piston clamp band 13.

As further illustrated in FIGS. i and 2, a band connector 19 connects the cylinder clamp band mount 6 to the piston clamp band mount 15 by means of connector rivets 21 and is characterized by a pair of connector bends 20. The connector bands 20 compensate for the difference in diameter between the cylinder clamp 2 and the piston clamp 12, to align the openings defined by the cylinder clamp band 3 and piston clamp band 13, as illustrated. It will be appreciated by those skilled in the art that while a single band connector 19 is illustrated connecting the cylinder clamp band 3 to the piston clamp band 13, additional band connectors 19 may be utilized, with various types of fasteners or by connecting welds, as deemed necessary in any specific application.

Referring now to FIG. 4 of the drawings, the band connector 19 is relocated to connect the cylinder clamp band 3 to the piston clamp band 13 by means of connector rivets 21 and application and installation of the cylinder repair bracket i of this invention is as follows. As heretofore described, the cylinder repair bracket I is utilized under circumstances where the fluid cylinder 23 has become worn such that the piston 25 slides easily in the cylinder housing 24 and this wear reduces or eliminates the fluid dampening effect in opening and closing the vehicle hatch 31 on the vehicle frame 30. Under these circumstances the cylinder repair bracket 1 can be used to restore this desired reduced dampening feature in the following manner: a cylinder repair bracket i having a cylinder clamp 2 and piston clamp 12 of proper size to fit the corresponding cylinder housing 24 and piston 25 of the fluid cylinder 23 to be repaired, is selected. The free end of the piston 25 of the fluid cylinder 23 is then removed from the corresponding piston bracket 27 and the cylinder clamp 2 and piston clamp 12 are enlarged by loosening the cylinder clamp band 3 and piston clamp band 13, using a screwdriver (not illustrated) inserted in the respective head slots 9. This action rotates the cylinder clamp band screw 7, piston clamp band screw 16, cylinder clamp screw gear 10 and piston clamp screw gear 17 in the proper direction. The cylinder clamp 2 and piston clamp 12 are then inserted over the free end of the piston 25 until the cylinder clamp 2 fits around the upper end of the cylinder housing 24, near the piston 25, where the screwdriver is again inserted in the head slot 9 of the cylinder clamp band screw 7 and the cylinder clamp screw gear 10 is operated by rotation of the screw head 8 in the opposite direction, to securely tighten the cylinder clamp band 3 on the cylinder housing 24. The screwdriver is then inserted in the head slot 9 of the piston clamp band screw 16 and the piston clamp screw gear 17 is operated to tighten the piston clamp band 13 on the piston 25 with a desired degree of tension. This tension is adjusted to restore the desired telescoping tension between the piston 25 and the cylinder housing 24 as the piston 25 slides in and out of the cylinder housing 24 with respect to the piston clamp 12 and the vehicle hatch 31 opens and closes on the vehicle frame 30. Accordingly, it will be appreciated by those skilled in the art that the cylinder clamp 2 remains tightly mounted on the cylinder housing 24, while the piston clamp 12 is mounted on the piston 25 with a degree of tension which may be adjusted by rotating the piston clamp band screw 16 to achieve the desired degree of extension and retraction tension in the piston 25.

It will be further appreciated by those skilled in the art that while the cylinder repair bracket 1 is illustrated in the drawing as a cylinder clamp 2 attached to a piston clamp 12 by means of a single band connector 19, the cylinder clamp 2, piston clamp 12 and band connector 19 can be fabricated in a single piece without the necessity of assembling the component parts, according to the knowledge of those skilled in the art. Furthermore, under circumstances where the cylinder repair bracket i is constructed by assembling the cylinder clamp 2, piston clamp 12 and band connector 19, in a most preferred embodiment of the invention the respective screw heads 8 of the cylinder clamp band screw 7 and the piston clamp band screw 16 are preferably placed adjacent to each other to facilitate easy access by a single screwdriver (not illustrated). Moreover, the band connector 19 may be attached to the cylinder clamp band 3 of the cylinder clamp 2 and the piston clamp band 13 of the piston clamp 12, as illustrated in FIG. 4, as well as the cylinder clamp band mount 6 and piston clamp band mount 15, as illustrated in FIGS. i and 2, by means of brads, pop rivets, metal glue and the like, further according to the knowledge of those skilled in the art. Additionally, while the cylinder clamp 2 and piston clamp 12 are illustrated in the drawing as conventional hose clamps of the slotted band type, it will be appreciated that other types of hose clamps known to those skilled in the art may be equally well used to fabricate the cylinder repair bracket of this invention, according to the teachings herein.

Accordingly, while the preferred embodiment of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A fluid-operated cylinder repair bracket for mounting on the cylinder housing and piston of an air-operated cylinder, comprising a first hose clamp having a first band mount, a first slotted band attached to said first band mount and tightly mounted on the cylinder housing adjacent to the piston, and a first screw rotatably mounted in said first band mount in driving relationship with said first slotted band, a second hose clamp having a second band mount, a second slotted band attached to said second band mount and mounted on the piston adjacent the cylinder in spaced relationship with respect to said first hose clamp and a second screw rotatably mounted in said second band mount in driving relationship with said second slotted band, a band connector having a pair of spaced-apart bends joining said first slotted band of said first hose clamp to said second slotted band of said second hose clamp and substantially aligning the openings defined by said first slotted band and said second slotted band, to receive the cylinder housing and the piston, respectively, whereby the sliding tension of the piston into and from the cylinder housing is selected by rotatable adjustment of said second screw in said second band mount of said second hose clamp.

2. The fluid-operated cylinder of claim 1 comprising fastening means connecting said band connector to said first slotted band and said second slotted band, said fastening means comprises rivets.

* * * * *